United States Patent [19]

Gibeau et al.

[11] 4,415,941

[45] Nov. 15, 1983

[54] LINEAR ACTUATOR FOR MEMORY STORAGE DEVICE

[75] Inventors: Frank C. Gibeau, Los Altos; Paul L. Farmer, San Martin, both of Calif.

[73] Assignee: Atasi Corporation, San Jose, Calif.

[21] Appl. No.: 278,867

[22] Filed: Jun. 29, 1981

[51] Int. Cl.³ .................. G11B 5/55; G11B 21/08; G11B 5/012

[52] U.S. Cl. .................. 360/106; 360/78; 360/98

[58] Field of Search .............. 360/104, 105, 106, 98, 360/137, 78

[56] References Cited

U.S. PATENT DOCUMENTS

| | | | |
|---|---|---|---|
| 3,735,163 | 5/1973 | Dijkstra | 360/106 |
| 3,922,720 | 11/1975 | Caletti | 360/106 |
| 4,012,780 | 3/1977 | Johnson | 360/78 |
| 4,196,456 | 4/1980 | Manzke | 360/106 |
| 4,318,145 | 3/1982 | Frandsen | 360/98 |
| 4,322,762 | 3/1982 | Manzke | 360/106 |

Primary Examiner—Robert Martin Kilgore

Attorney, Agent, or Firm—Alan H. MacPherson; Thomas S. MacDonald; Steven F. Caserza

[57] ABSTRACT

A linear actuator for translating accessing transducers such as read/write heads along a straight line path of travel relative to a rotating magnetic disk includes a carriage, a flat coil mounted to the disk and having an effective winding extending transversely at the rear end of the carriage, one pair of rollers mounted at right angles to each other at one side of the carriage in rolling engagement upon a cylindrical guide rail, two pairs of rollers similarly mounted at the other side of the carriage in rolling engagement upon a second guide rail. The second guide rail is fixedly mounted to a base frame; the other guide rail is pivotally mounted parallel to the other rail and is biased by a spring to preload the single pair of rollers against the pivotal rail. A pair of block magnets are mounted at the rear end of the base frame with a gap therebetween that is aligned with the path of travel of the effective winding. The pairs of rollers are symmetrical about the plane of the coil to minimize bending moments and thus enable rapid accessing without inducing vibrations.

11 Claims, 5 Drawing Figures

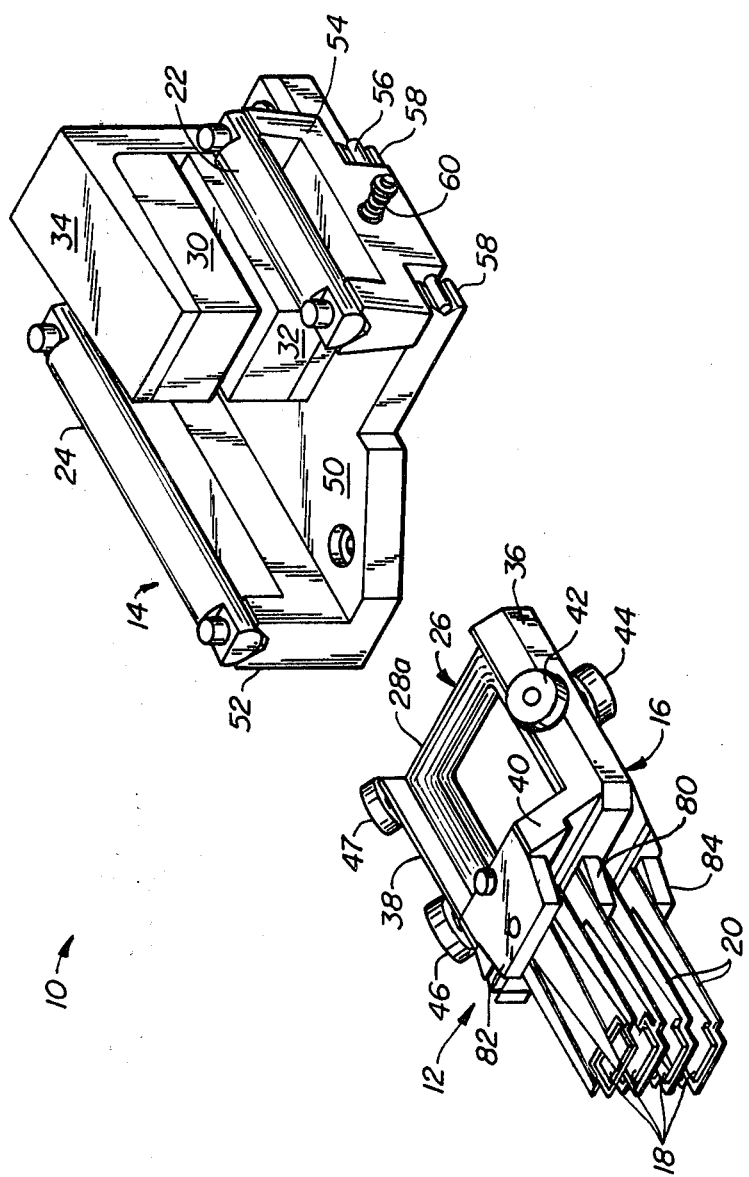
FIG.—1.

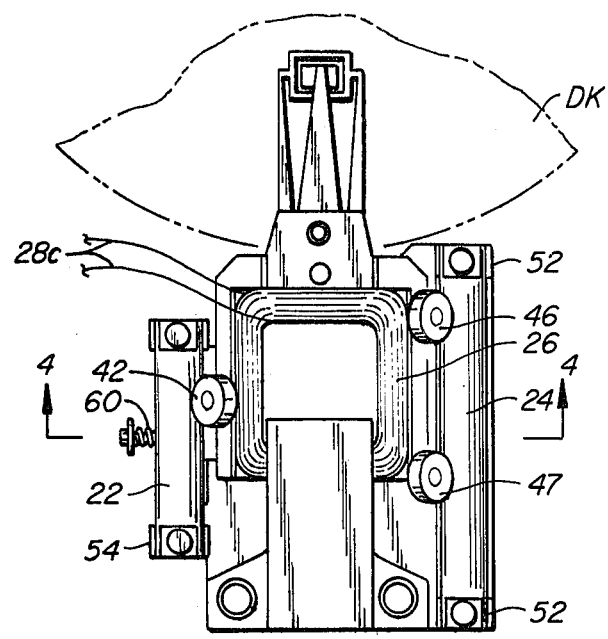
FIG._2.
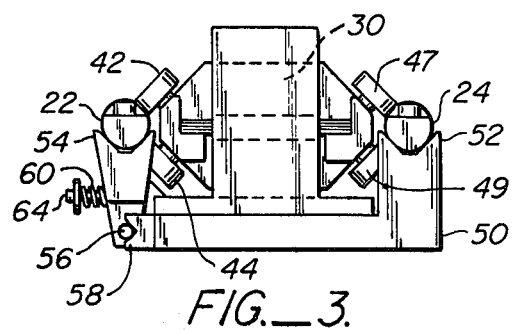
FIG._3.

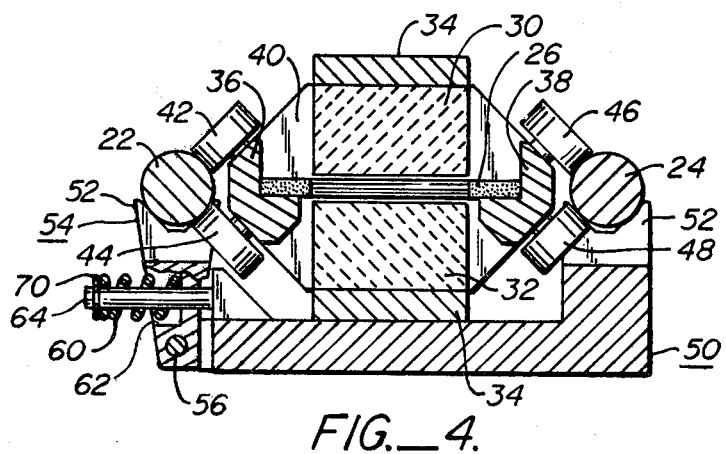
FIG._4.
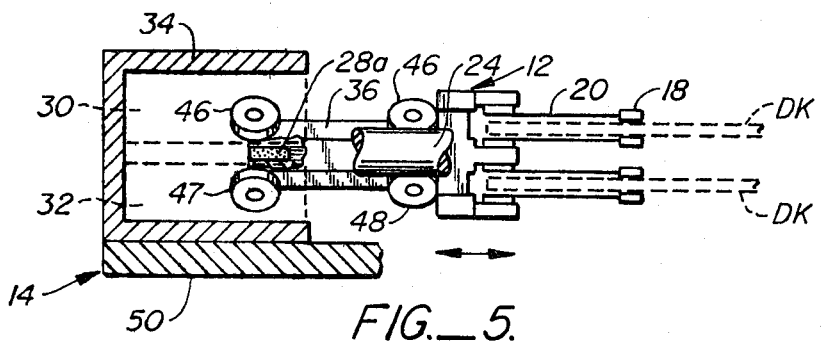
FIG._5.

LINEAR ACTUATOR FOR MEMORY STORAGE DEVICE

BACKGROUND OF THE INVENTION

1. Field of the Invention

This invention generally relates to an electromagnetic actuator assembly for moving an accessing transducer relative to media, such as a disk, upon which information is stored for magnetic or optical accession and more particularly to an actuator assembly for moving an accessing transducer along a straight line extending radially of the media, the assembly being hereinafter called a linear actuator.

2. Description of the Prior Art

U.S. Pat. No. 3,838,445 to Barnard discloses a linear actuator for a magnetic disk storage apparatus that utilizes a cylindrical rod to guide a carriage assembly along the desired straight line path of travel relative to a rotating magnetic disk. Assessing transducers are mounted in a cantilevered manner to the carriage assembly directly overhead the guide rod, the guide rod being mounted to a baseplate to extend radially under the rotating disk along the desired path of travel. The carriage is driven by a cylindrical voice coil motor coupled to the carriage assembly. According to this patent, the mass of the carriage is concentrated about an axis that is coincident with, or closely adjacent to, the so-called axis of frictional resistance and also the axis of drive force input, which axes are aligned with the voice coil motor. Two pairs of bearings are mounted in a balanced geometry at opposite sides of the carriage assembly to keep the carriage upright on the guide rod, and one of the bearings rides against a so-called swung way to preload or bias such bearing downwardly.

Another linear actuator for use in a magnetic disk storage apparatus is disclosed in U.S. Pat. No. 3,587,075 to Brown and MacArthur. As in the Barnard patent, the actuator includes a carriage assembly, and such assembly is guided in a precise linear path by a cylindrical guide rail. A cylindrical voice coil motor is provided for exerting a bidirectional drive force at the center of mass of the entire carriage assembly. Bearings are included in the carriage assembly to contact the guide rail at three points in the same vertical plane, and such bearings are spring-biased to keep the carriage aligned with the rail. A further pair of bearings is provided at one side of the carriage to ride along a flat support rail.

SUMMARY OF THE INVENTION

According to the present invention, an actuator for moving an accessing transducer along a linear path, that is, a linear actuator, includes a pair of precision cylindrical guide rails mounted parallel to the desired linear path of travel of the accessing transducer and a carriage having roller bearings mounted on opposite sides thereof to engage the guide rails. A generally flat coil member is mounted upon the carriage between bearings. At least one pair of permanent magnets of rectangular cross-section are fixedly mounted to a rigid base to provide an effective gap therebetween that is aligned with the path of travel of the effective coil section to bidirectionally drive the carriage in a direction and speed corresponding to the polarity and voltage of the direct current applied to the coil. Preferably, the coil member is mounted upon the carriage such that the effective coil section is located approximately coincident with the center of gravity of the carriage as a whole, and the roller bearings are arranged in pairs at each side of the carriage to engage the guide rails approximately equidistantly above and below the center of gravity of the carriage. With such a symmetrical relationship between the roller bearings and the flat effective coil section, practically all bending moments are eliminated in the plane that extends parallel to the coil section, thereby eliminating a potential source of vibration.

In the preferred embodiment, one of the cylindrical guide rails is fixedly mounted to the base (or frame of the assembly in which the linear actuator is used), and the other rail is mounted for pivoting about an axis that is parallel to the fixed rail. Such pivotable rail is biased by a spring toward the fixed rail to thereby preload the carriage between both rails with controlled or preselected low-friction rolling resistance.

Another preferred feature of the linear actuator of the present invention is that the actuator is of the long-gap/short-coil type, and the coil (more particularly, the flat effective coil section) is situated between the foremost and rearmost roller bearings. With this geometrical relationship, no significant bending moments are applied to the carriage in the plane parallel to the direction of travel, even when the carriage is moved to the extremities of its travel, that is, when the carriage is fully extended toward the media (e.g., the rotating disk) or fully retracted therefrom.

A principal advantage of the present invention is that the linear actuator of this invention is that the aforementioned symmetry of the bearings and flat coil section affords a high degree of stability so that when caused to move swiftly back and forth across the disk or other media, minimal vibrations and thus undesirable resonances will occur. Also, the flat coil member has a relatively low mass, thus providing rapid accessing time. Also, the flat coil section may be fabricated according to state-of-the-art techniques from printed circuit material, thus minimizing its potential cost of manufacture. The preferred spring-biased pivotal guide rail arrangement provides for precise low-friction guidance of the carriage, while yet reducing the complexity of assembly.

BRIEF DESCRIPTION OF THE DRAWINGS

FIG. 1 is an exploded isometric view of a preferred embodiment of the linear actuator of the present invention.

FIG. 2 is a relatively reduced top plan of the linear actuator, a portion of a rotating disk media being shown in phantom outline.

FIG. 3 is a rear elevation of the linear actuator, the edges of the block magnets being depicted in dashed outline.

FIG. 4 is a relatively enlarged section taken generally along line 4—4 of FIG. 2, but with parts being broken away to better illustrate the spring-biasing arrangement for the pivotal guide rail.

FIG. 5 is a fragmentary side elevational view that illustrates the symmetric relationship of the effective winding section of the flat coil to the roller bearings of the carriage of the linear actuator; in this view dashed outlining is provided to show the locations of the magnets and also the rotating disks.

DESCRIPTION OF THE PREFERRED EMBODIMENT

Now referring more particularly to FIGS. 1-3, it will be seen that a preferred embodiment of a linear actuator 10 includes a carriage 12 that is received for linear travel upon a base 14. The carriage includes a U-shaped frame 16 cast from a material of low or non-magnetic permeability such as aluminum. Transducers 18, in this embodiment, read/write heads are affixed to the leading of the carriage frame upon flexible support arms 20 (such arms being commonly referred to and hereinafter called flexures). The flexures 20 support the transducers in vertically spaced, parallel relationships above and below the two rotating magnetic disks DK (FIGS. 2 and 5) of a magnetic disk storage apparatus (not shown). The actuator 10, as previously discussed in connection with the prior art U.S. Pat. Nos. 3,838,455 and 3,587,075, serves to accurately and very rapidly position the transducers relative to the tracks of the disks.

The aforementioned stability of the linear actuator 10 is provided by supporting the carriage 12 for movement upon a pair of parallel, transversely spaced, precision cylindrical guide rails 22 and 24 further by utilizing a generally flat coil member 26 having a rectangular winding 28, and by mounting the coil upon the carriage so that the effective winding section 28a of the winding 28 lies in a plane aligned with the axes of the cylindrical guide rails 22 and 24. The actuator includes a pair of block shaped (rectangular) permanent magnets 30 and 32 mounted in parallel spaced apart relation upon a U-shaped bracket 34 so that the air gap between the magnets is aligned with the path of travel of the flat coil member. The bracket is made of high magnetic permeability material so that it provides a flux return path. The magnets are preferably formed from ceramic material. The magnet bracket 34 is affixed at the rear end (relative to the disks or other media) of the base frame 14. It is noted at this point that although in this embodiment the magnets and guide rails are secured upon an integral base frame, such parts could also be directly mounted to the frame of the apparatus in which the actuator is used, that is, to the frame a direct access, magnetic or optic memory drive unit.

The coil member is secured upon the carriage in a plane extending through the center of gravity thereof and the carriage is mounted for movement on the cylindrical guide rails 22 and 24 in a manner that assures that minimal bending moments (cantilevering action) will be induced upon the carriage by the electromagnetic forces to rapidly access the transducers 18. The carriage 16 includes roller bearings or rollers, as specified hereinafter, that are arranged in pairs at the sides of the carriage frame 16 to engage the rails 22 and 24. The lines of rolling contact of each pair of rollers are symmetrically disposed relative to the plane of the coil member indicted by the line A—A in FIG. 5 so that the point of application of force by the coil on the carriage—the center of the effective section 28a of the coil winding 28—is midway between the upper and lower rollers of each pair. It is, of course, understood the rollers maintain the carriage, and thus also the coil member 28, aligned with the parallel axes of the guide rails.

The configuration of the carriage frame 16 and the attachment of the rollers thereto will now be particularly described in connection with FIGS. 2-4. Frame 16 is generally U-shaped in top plane (FIG. 2) and includes side arms 36 and 38 that extend perpendicularly from a cross member 40. The frame is received on the rails 22 and 24 with the arms projecting away from the disks DK. The frame is of an integral construction which, as stated hereinbefore, is cast from a non-ferrous material. Side arms 36 and 38 are recessed (FIG. 4) to provide a cavity into which the coil member 26 is affixed. The arms are spaced from each other by a distance greater than the width of the magnets 30, 32 to allow the carriage frame to be retracted and extended with the side arms being disposed at opposite sides of the magnets (i.e., to register with the gap between the magnets) and with the coil member extending through such gap between the magnets. FIG. 5 shows the extended position of the carriage; the effective winding section 28a of the coil winding is then disposed near the front ends of the magnets (relative to the rotating disks DK).

As best seen in FIG. 4, the side arms 36 and 38 of the carriage frame 16 are cut away to provide upper flat surfaces or lands and lower lands. Such lands extend at 45° angles with the plane of the coil member 26, and thus the upper lands would, if projected, respectively perpendicularly intersect the planes of the lower lands. These lands provide surfaces for mounting the pairs of rollers at right angles with each other, as shall now be described.

A single pair of rollers 42 and 44 are mounted at the center of the left side arm 36 on pins or shafts extending perpendicularly from the upper and lower lands thereof. Two pairs of rollers are mounted to the other or right side arm 38. The front or leading pair of rollers 46 and 48 (FIGS. 2, 4 and 5) is mounted adjacent the front end of the right arm, and the trailing or rear pair of rollers 47 and 49 is mounted adjacent the rear end of the arm (FIGS. 2, 3 and 5). Such two pairs of rollers are also mounted similarly to rollers 42 and 44 so that the axes of rotation of the upper rollers are perpendicular to the axes of rotation of the underlying lower rollers. Such symmetry of the upper and lower rollers about the plane of the flat coil member 28 is such that the roller pairs engage the respective cylindrical guide rails, with two lines of rolling contact equidistantly spaced at opposite sides of (above and below in the illustrated arrangement) the plane through the axes of the guide rails 22 and 24 (i.e., the plane through line A—A in FIG. 5).

There is always some significant play in each of the rollers 42-49, that is, some limited looseness between the roller member in contact with the guide rails 22, 24 and the shafts thereof that are mounted to the side arms 36, 38 of the carriage frame 16. Another aspect of the present invention relates to the means for biasing (or preloading as it is popularly known) the rollers with a controlled relatively firm spring force against the cylindrical guide rails or rods 22 and 24 so that such play will not result in vibrations, particularly resonant vibrations. Vibrations may potentially be caused from such play when the carriage is rapidly accelerated or decelerated. In the preferred embodiment, preloading of the rollers is accomplished by fixedly mounting the guide rail 24 to a base frame 50 (FIGS. 1-4) and pivotally mounting the other guide rail 22 to base frame 50 for pivoting about an axis that is parallel to rail 24. The pivotal rail 24 is biased toward the fixed rail and is so mounted to the base frame that when it is firmly engaged between the single pair of rollers 42 and 44, the rails are aligned with the gap between the magnets and the coil member 26 is parallel to and equidistantly spaced between the magnets 30 and 32. The fixed rail 24 is secured upon pedestals 52 (FIGS. 1, 3 and 4). These pedestals hold the rail in elevated position to provide adequate clearance for movement of the lower rollers 44 and 48. The pivotal rail 22 is secured upon a Y-shaped pivotal pedestal structure 54, which as may be best seen in FIGS. 1 and 4, provides clearance for movement of the lower roller 44.

The pivotal mounting pedestal 54 includes posts at its forward and rearward ends upon which the rail 22 is supported. A pivot pin 56 is received in a bore extending longitudinally through its lower end (i.e., its end that is opposite from the rail 22). The front and rear ends of the pivot pin 56 are engaged in V-shaped grooves formed in extensions 58 at the side of the base 18 (FIGS. 1 and 3). Such grooves are formed to enable the pedestal 54 to pivot about an axis that is parallel to the fixed rail 24. The height of pivotal pedestal and the width of the base (particularly, the transverse distance between grooves for the pivot pin and fixed rail 24) are arranged to cause the flat coil 26 to be aligned with the axes of rails 22 and 24, thus properly in the magnet gap, when the rail 22 is preloaded or biased against the associated carriage rollers 42 and 44.

The pivotal rail 22 is spring-biased toward the fixed rail 24 by a coil spring 60. Referring to FIGS. 1 and 4, the spring 60 is received in an outwardly facing, countersunk portion of a bore 62 formed in the base of the pivotal pedestal 54. The spring is engaged upon a pin 64 that extends transversely and outwardly from a base support portion 66. The pin 64 extends through a smaller portion of bore 60 through the pedestal that is coaxial with the countersunk bore portions and a split ring or clip 70 is attached at the outer end of the pin to engage the spring in compression against the pedestal. It will be appreciated that manufacture and assembly of this preloading or spring-biasing arrangement is quite simple but yet the arrangement provides excellent preloading characteristics.

The coil 28 is illustrated herein as a coil of copper wire having leads 28c; such leads are only diagrammatically shown, it being understood by those of skill in this art that a flexible lead strip is provided for connection to the direct current power source of the associated memory accessing device (direct access storage device). The illustrated coil was formed on a removable rectangular coil form so that the longitudinal or side sections of the rectangular coil are sufficiently spaced from the sides of magnets 32, 34, thus making effective coil section 28a longer than the width of the magnets. Due to the comparatively small width of the effective coil section relative to the length of the magnets, the coil and magnet arrangement of the actuator 10 is of the so-called short coil/long gap type.

The front end of the flat coil 26 abuts against the transverse portion 40 of the carriage frame 16, and the coil has a length measured in its direction of travel such that its effective coil section 28a (at the rear end of the coil) is situated between the axes of the forward rollers 46 and 48 and rearward rollers 48 and 49. That is, the straight flat effective coil section extends transversely of the carriage ahead of a transverse plane through the axes of the rear pair of rollers 48 and 49. This positioning minimizes any tendency for the coil to induce a bending moment on cantilevering action on the carriage about any of the rollers.

It is noted, however, that the coil 28 may also be fabricated using state-of-the-art printed circuit board technology, such as, for example, shown in the U.S. Pat. No. 4,196,456 to Manzke et al.

The connection of the flexures 20 to the carriage frame will now be briefly described. The integral transverse portion 40 at the front end of the carriage frame 16 extends substantially above and below the coil 26. The transverse frame portion is cut away at its corners to match the flats or lands on the side arms, thereby minimizing the weight of the frame. A center pair of flexures are affixed to flat projection 80 extending transversely at the center of the front face of the frame. An upper flexure is affixed to the underside of a removable plate 82 that is received in a recess formed in the upper edge of the transverse portion 40. Similarly, a lower flexure is affixed upon the upper face of a plate 84 that is removably received with a recess formed in the lower edge of the transverse portion of the frame. The plates 82 and 84 are each detachably secured by a screw to the frame. The particular flexure connection of this preferred embodiment facilitates precise assembly of flexures, while providing a compactness that reduces the overall length of the linear actuator 10. It is, however, understood that other means for mounting the accessing transducers to the carriage would also be suitable and that transducers other than those diagrammatically illustrated herein can be provided. It is, for example, intended that optical transducers can also be incorporated in the actuator.

Although the best mode contemplated for carrying out the present invetion has been herein shown and described, it will be apparent that modification and variation may be made without departing from what is regarded to be the subject matter of the invention.

What is claimed is:

1. A linear actuator for moving a transducer back and forth along a linear path of travel relative to media such as a rotating disk media, the actuator comprising: first and second cylindrical guide members, means for mounting the guide members in spaced relationship parallel to the media, a carriage, means for mounting the transducer to one end of said carriage, an essentially rectangular flat coil member mounted to said carriage and including a flat effective winding section and a second winding section, each extending transversely of the direction of travel of the carriage, roller means mounted to said carriage in rolling engagement against the cylindrical guide members for guiding the carriage back and forth along the guide members, said roller means including pairs of displaced rollers at each side of the carriage for engagement against the associated guide member, said pairs of rollers and said coil member being mounted upon the carriage so that the flat effective winding section of said coil member is parallel to the direction of travel and is spaced between the rollers of each pair of rollers, and a pair of spaced permanent magnets fixedly mounted relative to the carriage and having a gap therebetween in alignment with the path of travel through said gap of the flat effective winding section of the coil member, said magnets being laterally outward from said media and said second transverse winding section being outside said gap during the travel of said carriage.

2. The linear actuator according to claim 1 wherein said means for mounting said first and second cylindrical guide members includes means for fixedly mounting one of the guide members parallel to the desired path of travel of the carriage, means for pivotally mounting the other guide member for pivoting about an axis that is parallel to the fixedly mounted guide member, and means for biasing the pivotally mounted guide member toward the fixedly mounted guide member.

3. The linear actuator according to either claim 1 or claim 2 wherein the coil member is generally flat and is mounted so that the plane thereof is equidistantly spaced between the displaced rollers of each pair of rollers.

4. The linear actuator according to claim 3 wherein said generally flat coil member is mounted to the carriage to intersect the center of gravity thereof.

5. The linear actuator according to claim 3 wherein the flat coil member has a winding that is generally rectangular in a plane parallel to the direction of travel of the carriage and the flat effective winding section is disposed in said gap adjacent the end of carriage that is opposite from the end to which the transducer is mounted.

6. The linear actuator according to claim 5 wherein said magnets have an elongate rectangular outline in the linear direction of travel of the carriage, the length of the magnets being considerably greater than the dimension of the flat effective winding section in its direction of travel.

7. The linear actuator according to either claim 1 or claim 2 wherein said roller means includes two pairs of rollers on one side of the carriage for rolling engagement against the associated cylindrical guide member, said coil member being mounted to the carriage so that the flat effective winding section thereof is located between the axes of said two pairs of rollers.

8. The linear actuator according to either claim 1 or claim 2 wherein said carriage includes a U-shaped member having a transverse portion and a pair of arms projecting in spaced parallel relation from the transverse portion, said coil member being mounted between said arms with the effective winding section being distal from the transverse portion and extending transversely between the ends of said arms, opposite said transverse portion, said transducer being mounted to said transverse portion at the opposite side thereof from the coil member.

9. The linear actuator according to claim 8 wherein said magnets comprise block shaped magnets fixedly mounted above and below the path of travel of the effective winding section.

10. An actuator mechanism for linearly translating a transducer comprising: base support means, a transducer, a pair of rails, means for mounting said rails to said base support means in spaced relationship parallel to a desired straight line path of travel, a pair of permanent magnets, means for mounting the magnets in spaced parallel relationship to the base support means to form a gap between the magnets that is also parallel to said path of travel, a carriage movably received upon said parallel rails, said carriage including upper and lower support rollers at opposite sides that roll upon said rails, rectangular coil means including a first transverse flat coil section for interacting with the magnetic field within said gap in said path of travel and a second transverse flat coil section outside said field, and means for mounting said coil means to said carriage member so that said first coil section extends transversely of the path of travel in said gap and at a position upon said carriage that is spaced equidistantly between the upper and lower support rollers, said means for mounting said coil means including a transverse member supporting said transducer and wherein said second transverse coil section abuts said transverse member.

11. An actuator mechanism for linearly translating a transducer comprising: base support means, a transducer; a first fixed rail and a second bias rail, means for mounting said rails to said base support means in spaced relationship parallel to a desired straight line path of travel, a pair of permanent magnets, means for mounting the magnets in spaced parallel relationship to the base support means to form a gap between the magnets that is also parallel to said path of travel, a carriage movably received upon said parallel rails, said carriage including a first pair of upper and lower support rollers at one side that roll on said bias rail and two pairs of spaced upper and lower support rollers at a second side that roll upon said fixed rail, coil means including at least one flat coil section for interacting with the magnetic field within said gap, means for mounting said coil means to said carriage member so that said coil section extends transversely of the path of travel in said gap and at a position upon said carriage that is spaced equidistantly between the upper and lower support rollers and means associated with said bias rail to spring bias said rail against said first pair of rollers and to firmly seat said two pairs of rollers in rolling line contact with said fixed rail.

* * * * *